Nov. 30, 1965  D. GABRIELSEN  3,220,126
MULTISENSORY INTELLIGENCE TRANSMISSION DEVICES
Filed May 4, 1960  7 Sheets-Sheet 2

Fig. 2

INVENTOR.
DAVID GABRIELSEN
BY
ATTORNEY

Nov. 30, 1965     D. GABRIELSEN     3,220,126

MULTISENSORY INTELLIGENCE TRANSMISSION DEVICES

Filed May 4, 1960     7 Sheets-Sheet 4

INVENTOR.
DAVID GABRIELSEN
BY
ATTORNEY

INVENTOR.
DAVID GABRIELSEN
BY
ATTORNEY

United States Patent Office 3,220,126
Patented Nov. 30, 1965

3,220,126
MULTISENSORY INTELLIGENCE TRANSMISSION DEVICES
David Gabrielsen, North Tarrytown, N.Y., assignor to Sono-Libra, Inc., North Tarrytown, N.Y., a corporation of New York
Filed May 4, 1960, Ser. No. 26,862
4 Claims. (Cl. 40—28.3)

This invention relates to multi-sensory intelligence transmission, and particularly to a novel and improved construction for effecting the presentation of visual media in synchronism with related aurally reproduced sound.

Multi-sensory intelligence transmission devices for effecting the synchronous presentation of visual media with related aurally reproduced sound, such as motion pictures, film strips, slide and rear projection devices, are in widespread use today in many fields wherein comprehension of transmitted intelligence is facilitated by exposure of a plurality of the recipient's senses thereto. Such devices as those mentioned above which are in common use, usually require a darkened room and special projection screens for visually effective presentation purposes. Additionally, they are relatively expensive and of a cumbersome and complicated nature that is oftentimes beyond the operational capabilities of younger age group subjects, and are generally of such a nature as to effectively preclude easy and efficient individual utilization thereof and inexpensive production of the visually presentable media. The disadvantages of such systems have been long recognized. Attempts have been made in the past to overcome these disadvantages, and particularly the necessity of a darkened room for presentation purposes, by provision of an automatic page-turning mechanism for visually presentable media that is synchronized with aurally reproduced sound. One such device, by way of example, is illustrated in United States Patent No. 2,323,628. Such devices, however, in so far as I am aware, have never been successful due, at least in part, to a lack of sensitivity of the synchronizing systems employed, a lack of ready visibility of the visually presentable media, inherent limitations in the size of the visually presentable media due to space or other limitations created by the structural arrangement of the page-turning mechanisms, a lack of means for effecting positive timed displacement of the visually presented media, and expense factors involved in the preparation of the visually presentable media utilizable therein.

This invention may be briefly described as an improved construction for effecting the automatically synchronized presentation of related visual media and aurally reproduced sound wherein such synchronization is automatically effected by an inaudible signal previously introduced at predetermined intervals in the stored sonal intelligence. Broadly included therein is an improved construction for the mounting and positioning of the visually presentable media in association with an improved page release indexing system to effect the synchronized presentation thereof that permits utilization of visual media of greatly enlarged dimensions as well as the arrangement of such media in an improved book-like form that functionally cooperates with said mounting and positioning and page release indexing means to assure its selective presentation in a positive yet unobtrusive manner. Also included within the scope of the invention is an improved constructional configuration for the individual pages of the book-like arrangement that permits its direct utilization for visual media presentation or its utilization as a reusable selective support for separately prepared media on readily removable and inexpensive overlays to effectively remove any material economic limitations in the preparation and fabrication thereof.

Among the advantages of the herein disclosed invention is the provision of an improved, inexpensive, compact, self-contained and readily portable construction for effecting the automatic synchronized presentation of related visual media and aurally reproduced sound that features an extreme simplicity of operation, a capability for extended operation on a day-to-day basis, and the permitted economical preparation of both the aurally reproducible sound and the visually presentable media by a user thereof in any desired quantity and with any desired degree of detail or elaboration. Other advantages include a permitted wide versatility of intended use, a permitted utilization of greatly enlarged visually presentable media that is capable of being viewed by large groups without requiring room darkening or auxiliary screens, and a ready adaptability to varying systems for the production of aurally reproduced sound. Still other advantages include an improved constructional arrangement and configuration for the individual pages of the book-like arrangement that permits direct imposition of the visually presentable media thereon or utilization thereof as a reusable support for an overlay of separately prepared visually presentable media and thereby affords such appreciable economies in the fabrication of such media as to permit inexpensive utilization thereof even in extremely limited quantities.

The object of this invention is the provision of an improved and novel construction for effecting the automatic synchronized presentation of visual media with related aurally reproduced sound.

Other objects and advantages of the herein disclosed invention will be set forth in the following specification and claims, and will be apparent from the accompanying drawings which show, by way of example, the principles underlying the invention and certain presently preferred embodiments of multisensory intelligence transmission devices that incorporate those principles.

Referring to the drawings.

Figure 1:
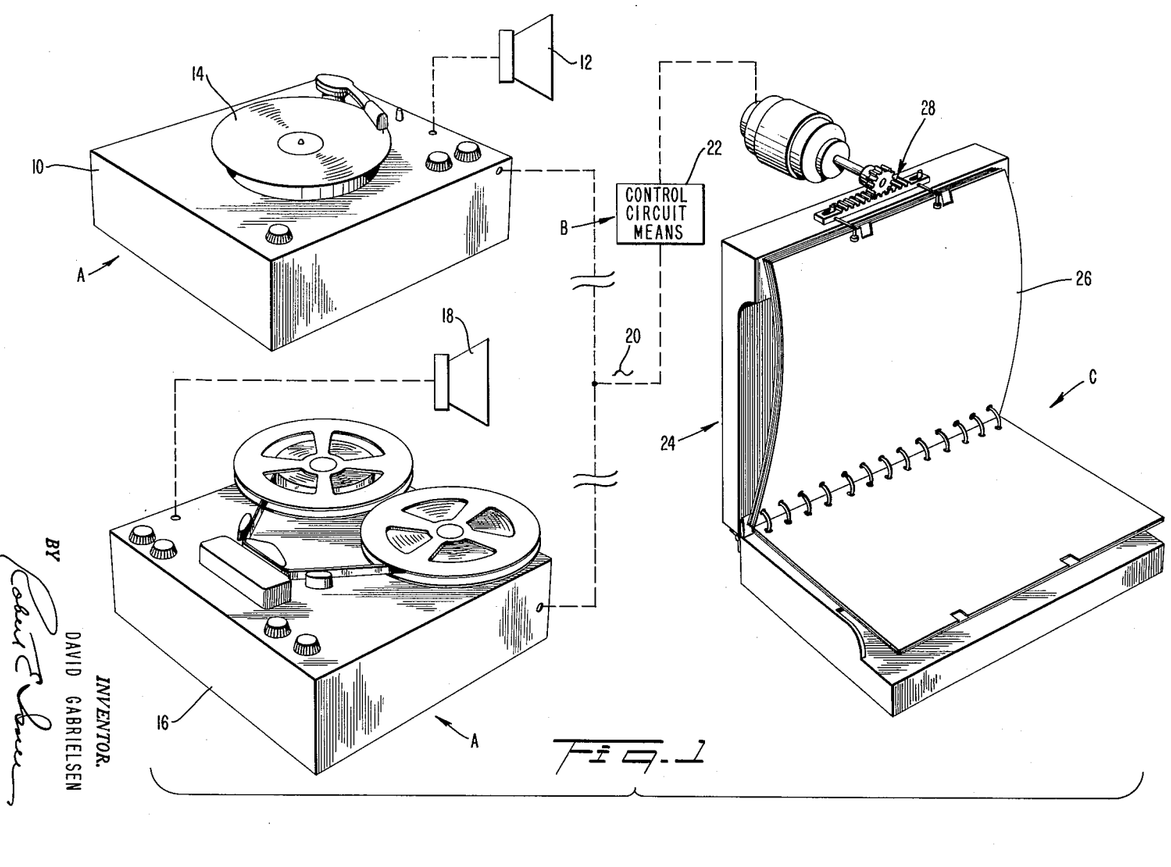
FIGURE 1 is a schematic and diagrammatic representation of the interrelationship of the major components of the herein described constructions.

By way of general introduction and with reference to the schematic showing of FIGURE 1 of the drawings, the multisensory intelligence tranmission device forming the subject matter of the herein disclosed invention broadly includes means for effecting the aural reproduction and controlled amplification of pre-prepared and stored sonal intelligence, as generally illustrated at A; a control circuit means for sensing aurally inaudible electrical synchronizing signals preintroduced and integrally contained at predetermined selective intervals in the stored sonal intelligence and providing a synchronizing output signal in response thereto, generally illustrated at B; and means responsive to said synchronizing signal output of said control circuit means for automatically effecting the selective displacement of individual pages of pre-prepared visual media in predetermined relation with the aurally reproduced sound, as generally illustrated at C.

As there shown, the means for effecting the aural reproduction and controlled amplification of the stored sonal intelligence may suitably be a phonograph 10 having an integral and internally disposed audio amplifier means driving a loudspeaker 12 for aurally reproducing sonal intelligence stored on a phonograph record 14 or may be, with equal facility, a tape playback unit 16 having integral and internally disposed audio amplifier means driving a loudspeaker 18, for aurally reproducing sonal intelligence stored on a tape.

Automatic operation is effected by the pre-introduction, at predetermined desired intervals, of an aurally inaudible electrical pulse into the stored sonal intelligence, suitably a 30 cycle pulse of sine wave form, as schematically illustrated at 20, of such duration and amplitude as to permit selective sensing thereof by the control circuit means 22 to provide the desired synchronizing control function as hereinafter described. The control circuit means 22 is adapted to selectively sense said pulse 20 and provide a complemental output signal of sufficient strength to initiate actuation of the visual media displacement means.

The visual media displacement means, as schematically illustrated at C, broadly includes a visual media mounting means, generally designated 24, arranged to hold and properly position a particularly bound booklike arrangement of a plurality of pages 26 of visually presentable media in a substantially vertical plane and in slightly bowed condition and a cooperatively associated page release indexing mechanism, generally designated 28, adapted to selectively release the lead and exposed page bearing or supporting the visually presentable media upon actuation thereof by the synchronizing signal output of the control circuit means 22, which released page of visually presentable media is pivotally and positively displaced about its dependent binding edge to at least a substantially horizontal position, thereby removing the heretofore exposed visual media from the view of an observer and concomitantly uncovering the visually presentable media on the now exposed and next succeeding page thereof. As will be apparent to those skilled in this art, the visual media displacement means is of appreciable utility irrespective of whether or not it is incorporated with a self-contained unit for aurally reproducing sonic intelligence.

The invention and the principles underlying the same will now be more specifically illustrated and described in conjunction with certain presently preferred embodiments thereof.

Figure 2:
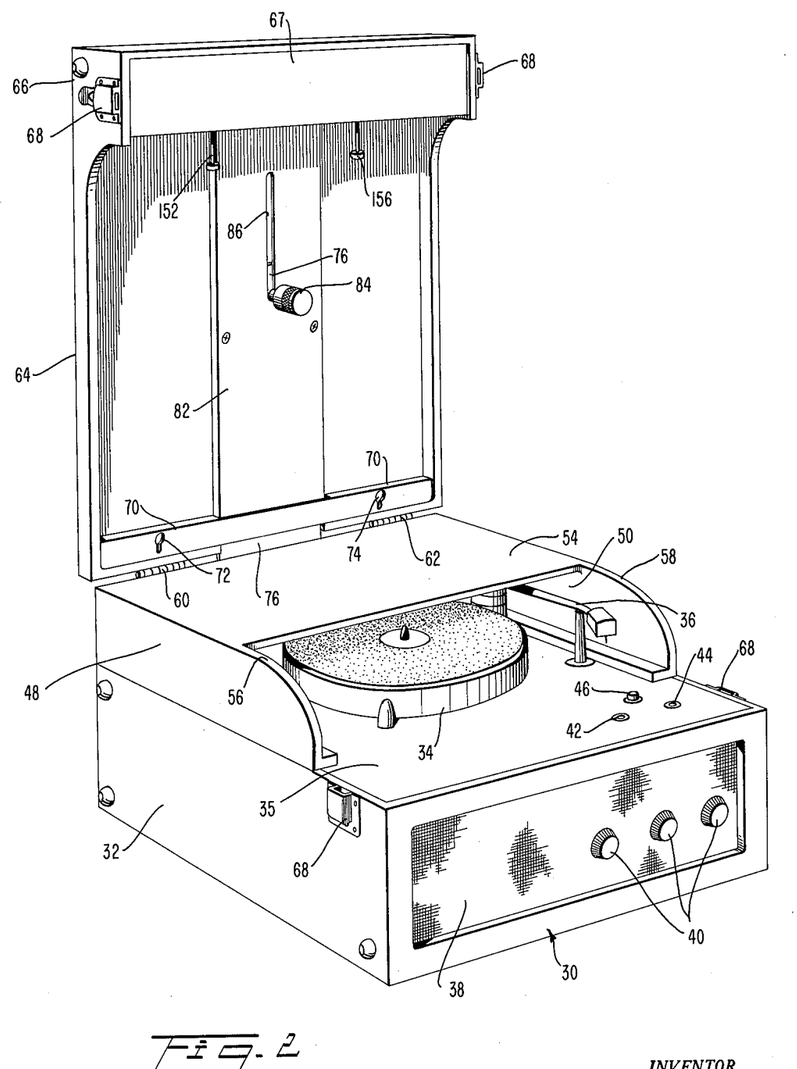
FIGURE 2 is an oblique view of a presently preferred embodiment in the form of a self-contained and readily portable unit constructed in accordance with the principles of this invention and incorporating a phonograph for reproduction of stored aural intelligence.
Figure 3:
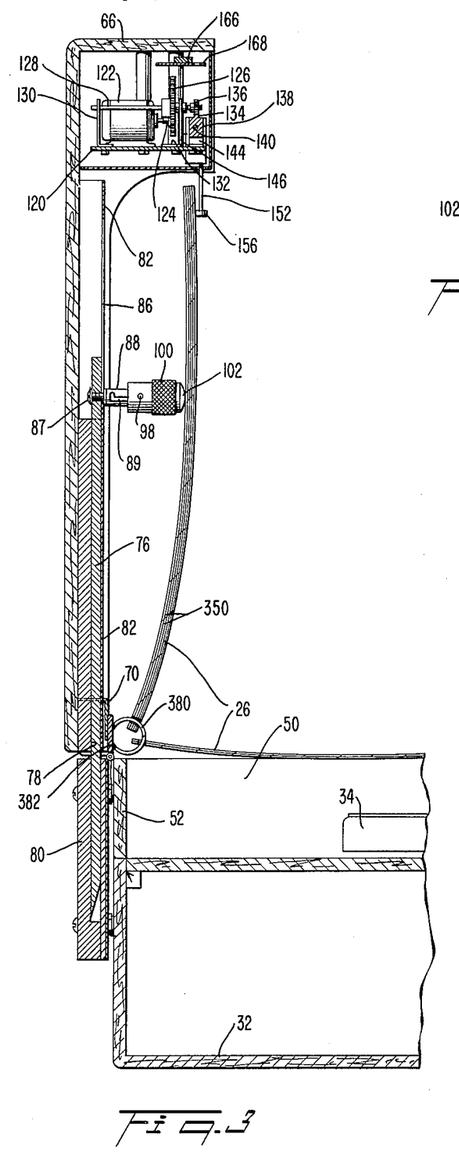
FIGURE 3 is a sectional view of the visual media mountnig and positioning assembly and page release indexing assembly embodied in the unit illustrated in FIGURE 2.

As illustrated in FIGURES 2 and 3, a preferred embodiment of the invention is provided in the form of a compact, self-contained portable unit incorporating, by way of illustrative example, a phonograph for effecting the aural reproduction of the sonal intelligence desired to be transmitted. There is provided a rectangular case 30 formed of a bottom or base portion 32 and a pivotally displaceable cover portion 64, which as will be explained at a later point in the specification, serves to mount and position the visually presentable media as well as house the page release indexing assembly. The bottom or base portion 32 is generally in the form of a rectangular box sized to contain, in the illustrated embodiment, a complete sound reproduction system including a motor operated turntable 34 and pivotally displaceable pickup arm 36 mounted on the upper surface 35 thereof, and with the control circuit means 22 and a self-contained audio amplifier and loudspeaker located therewithin and disposed behind the front panel 38. Manually operable exposed control knobs 40 are conventionally provided for start-stop, volume and tone control purposes. Such a unit preferably includes a jack 42 to selectively permit individual earphone utilization in lieu of the speaker for private tutoring purposes, a second jack 44 to accommodate selective utilization of a tape playback unit in lieu of the phonograph and in conjunction with the self-contained control circuit means, audio amplifier and speaker for situations where the stored sonal intelligence is on a tape rather than a record and readily accessible control button 46 to afford a manual overriding control for actuation of the page release indexing mechanism in accordance with the desires of a user, as for example where the sonal intelligence is being orally delivered and wherein the visually presentable media is to be presented in accordance with the orator's pace of delivery. A suitable electrical circuit for affording the above described flexibility of use will be later described by way of specific example.

Peripherally mounted on the bordering edges of the upper surface 35 of the base portion 32 are a pair of vertically disposed auxiliary partial side wall portions 48, 50 and a rear wall portion 52 forming a generally U-shaped enclosure for the turntable 34 and pickup arm 36 mounted thereon. The above described U-shaped enclosure is partially covered by a horizontally disposed visual media support plate or member 54, which together with the extending exposed and coplanar edge portions 56, 58 of the side wall portions 48 and 50, respectively, functions to support the released pages of the visually presentable media 26 in a substantially horizontal position and effectively out of the line of view of an observer thereof. The support plate or member 54 is suitably spaced from the surface 35 so as to readily permit manual record mounting on the turntable 34 and pickup arm location thereon.

Although the specific unit illustrated in the drawings incorporates a self-contained phonograph for the aural reproduction of the sonal intelligence, at least equal, if not greater, utility would be afforded by the inclusion of a tape recorder or tape playback unit in lieu thereof.

Utilization of a tape unit in lieu of the illustrated phonograph would probably afford a further diminution of size and weight, particularly if a transistorized unit was employed, as well as providing a unit wherein the stored sonal intelligence could be individually prepared by a user thereof.

Pivotally connected to the upper edge of the rear wall portion 52 as by hinges 60 and 62 is the cover member 64 forming a part of the housing for the unit, as illustrated in its open position. The cover member 64 is shaped to provide a terminal end portion 66 of appreciably increased depth with a coverplate 67 disposed thereover for housing the page release indexing assembly and is generally shaped and sized to be complementally received, when in its closed position, in abutting relation by the front section of the base portion 32 to form a compact and readily portable closed unit of unbroken external configuration and of pleasing appearance. Suitably located snap fasteners 68 are desirably provided to secure the cover member 64 in its closed position to the base portion 32.

In the illustrated embodiment, the inner surface of the cover member 64 is provided with a transversely disposed metal mounting strip 70 along and closely adjacent to the hinged lower edge thereof having its exposed surface disposed substantially flush with the rear edge of the media support plate 54 when said cover member 64 is in its open position. The mounting strip 70 is provided with a visual media mounting means in the form of a plurality of selectively located keyhole shaped apertures 72, 74 complementally engageable by selectively shaped mounting means on the binding edge of a booklike assemblage of pages visually presentable media, as will hereinafter be described, to support and properly position the same relative to the page release indexing assembly.

Figure 4:
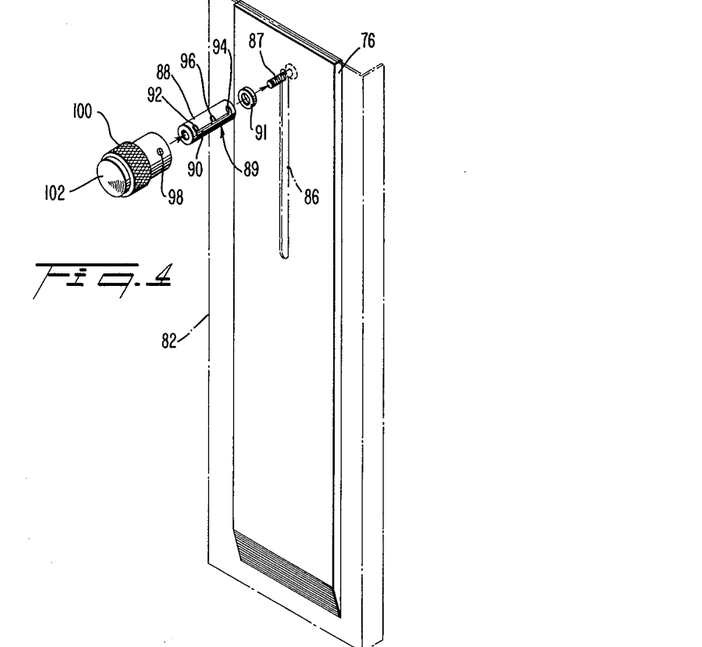
FIGURE 4 is an exploded oblique view of the cover member positioning and locking assembly.
Figure 5:
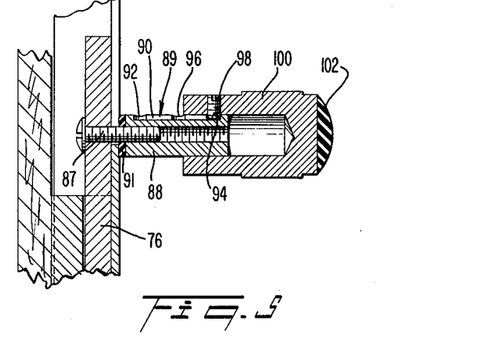
FIGURE 5 is a detailed sectional view of the cover member positioning and locking assembly illustrated in FIGURE 4.

It is necessary to secure the cover member in the vertical plane and in perpendicular relation to the support plate 54 for proper operation and, in the illustrated embodiment, this is effected by manually displaceable backing or spine member 76. The dependent edge of said spine member 76 (see FIGURE 3) is preferably slightly tapered and is sized to pass through an aperture 78 in the hinged edge of the cover member 64 and be received, in closely fitting relationship, within a receptacle member 80 externally mounted on the rear wall 52 of the base 32. As shown in FIGURES 2 and 3, said spine member 76 is slideably contained within a generally U-shaped slotted housing member 82 secured to the inner surface of the cover member 64. Displacement of said spine member 76 is effected by manual operation of a lineally extendable and longitudinally and rotationally displaceable knob assembly 84 connected to said spine member 76 through a longitudinally disposed slot 86 in said housing member 82. As best shown in FIGURES 4 and 5, the knob assembly 84 includes a bolt member 87 perpendicularly secured to the spine member 76 and sized to extend through the slot 86 in the housing member 82. Threadedly mounted on the extending end of the bolt member 87 and disposed in adjacent abutting relation with the outer surface of the housing member 82 is a cylindrical sleeve 88 having a generally E-shaped keyway 89 recessed in the surface thereof. The E-shaped keyway 89 includes an elongate longitudinally disposed track 90, a pair of relatively short terminally disposed transverse tracks 92 and 94 and an intermediate transversely disposed track 96. Mounted on the sleeve 88, and displaceably secured thereto as by a set screw 98 sized to have its dependent end ride in said keyway 89, is a knurled knob member 100, preferably having a rubber covered end 102.

As illustrated, the spine or backing member 76 is vertically displaceable within the housing member 82. When the spine member 76 is disposed at its upper limit of displacement, as determined by the engagement of the bolt 87 with the upper end of the slot 86, the dependent end thereof will be contained entirely within the cover 64, thus permitting pivotal displacement thereof for opening and closing purposes. When the spine member 76 is disposed at its lower limit of displacement as determined by the engagement of the bolt 87 with the dependent end of the slot 86, the dependent end of the spine member 76 will be disposed within the receptacle 80 and the cover will be rigidly secured in its vertical open position. The illustrated knob assembly permits a locking of the spine member 76 at its upper and lower positions as well as additionally functioning to properly position the visually presentable media, as will be explained hereinafter. The locking action is readily effected by rotative displacement of the sleeve 88 by manual rotative displacement of the knurled knob 100. Because of the threaded engagement of the sleeve 88 on the bolt 87, rotative displacement thereof results in a concomitant lineal displacement along the longitudinal axis of the bolt 87 and in a permitted compressive engagement of the portions of the housing 82 bordering the slot 86 intermediate a washer 91 disposed adjacent the end of said sleeve 88 and the surface of the spine member 76.

When the cover member 64 is disposed in its open position by disposition of the dependent end of the spine member 76 in the receptacle 80 and locked in such position by the above described rotative displacement of the sleeve 88, the knob 100 is disposed at a proper elevation intermediate the mounting strip 70 and the page release indexing assembly in the terminal end 66 of the cover 64 to cooperatively function therewith to effect visual media displacement. Selective positioning of the knob 100 in the direction perpendicular to the plane of the cover member 64 is effected by longitudinal displacement thereof relative to said sleeve 88. The proper positioning thereof is effected by introduction of the dependent end of the set screw 98 into either the intermediate transverse track 96 or the transverse terminal track 92. When so located in the intermediate track 96, the knob 100 will be properly positioned to effect the desired bowing of a properly mounted booklike arrangement of visually presentable media sized to be releasably indexed by the page release indexing means illustrated in FIGURES 3, 6 and 7. When so located in the terminal track 92, the knob 100 will be properly positioned to effect the desired bowing of a properly mounted booklike arrangement of visually presentable media of further enlarged size that is adapted to be releasably indexed by the auxiliary page release indexing means illustrated in FIGURES 17 and 18.

The page release indexing means serves to cooperatively function with the heretofore described structures to properly position the visually presentable media as well as to effect the selective release of individual elements thereof in response to the receipt of a synchronizing signal contained in the stored aural intelligence. In order to serve the dual function of page retention and page release, the page releasing indexing means, in accordance with the principles of this invention, includes stylus means engageable with the upper marginal edge of the pages of the visually presentable media that are reciprocably displaceable intermediate a pair of defined limiting positions, conveniently designatable as the first and second indexing positions. Although such reciprocating stylii displacement can be effected in numerous ways as by utilization of solenoids or motor operated cams, the hereinafter described construction constitutes a presently preferred embodiment that affords an accurate definition of the first and second indexing positions by utilization of inexpensive components.

Figure 6:
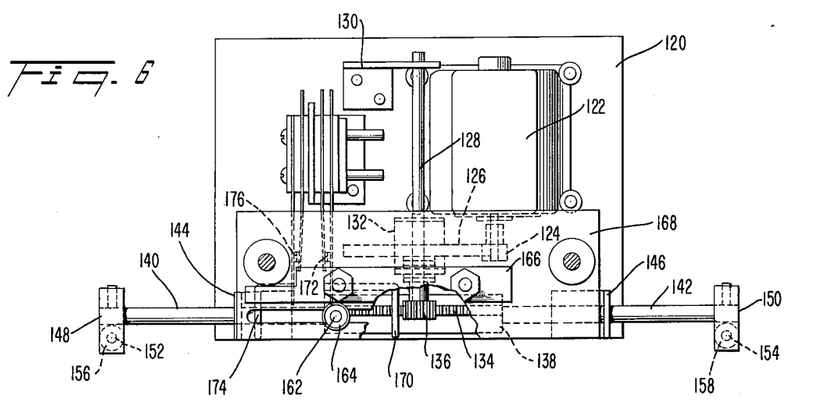
FIGURE 6 is a plan view of the page release indexing assembly incorporated in the embodiment illustrated in FIGURE 2.
Figure 7:
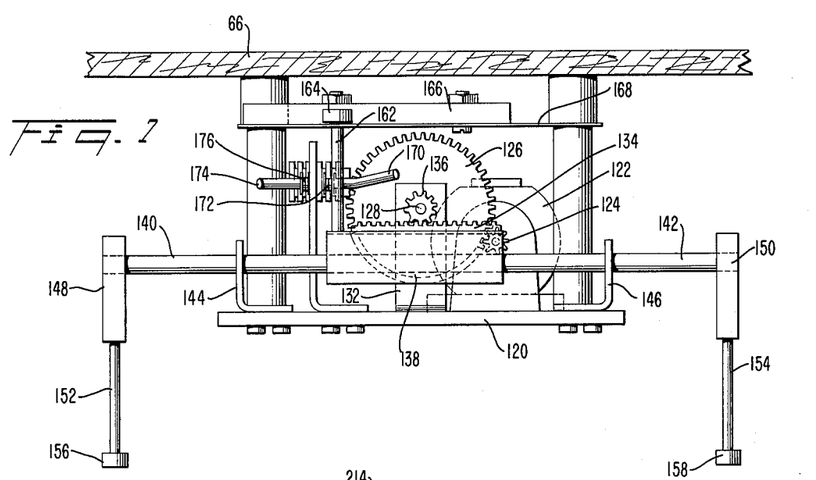
FIGURE 7 is a front elevation of the page release indexing assembly illustrated in FIGURE 6.

FIGURES 6 and 7 illustrate the constructional details of such presently preferred embodiment of a page release indexing assembly sized to be housed within the terminal end portion 66 of the cover member 64. As shown, there is provided a base plate 120 adapted to be fixedly secured to the cover member 64. Mounted on the base plate 120 is a small D.C. motor 122 having a drive gear 124 secured to the drive shaft thereof. The drive gear 124 engages an idler gear 126 mounted on an auxiliary shaft 128 that is rotatably supported by a pair of spaced standards 130, 132. Mounted on the forward end of the auxiliary shaft 128 and disposed in driving engagement with a horizontally displaceable rack 134, is a drive pinion 136. The rack 134 is mounted on the upper surface of a support member 138 having a pair of aligned horizontally disposed rods 140, 142 extending outwardly from the ends thereof. The rods 140, 142 are slideably supported by a pair of selectively located supporting standards 144, 146 mounted near the ends of said base plate 120. Mounted at the ends of the rods 140, 142 are a pair of connector members 148, 150, respectively. Dependent from the connector members 148 and 150 are a pair of spaced rodlike indexing stylii 152, 154 preferably having small roller bearings 156, 158 mounted on the aligned and coplanar dependent ends thereof. Preferably, the inner races of the roller bearings 156, 158 are tightly press-fit onto the dependent ends of the stylii 152, 154 and the exposed outer races thereof are thus rendered freely rotatable. As illustrated in FIGURES 2 and 3, the stylii 152, 154 extend downwardly through suitable elongate slots in the underside of the housing cover member 67 and are disposed forwardly of the mounting strip 70. Perpendicularly mounted on the base member 138 adjacent one end of the rack 134 is a vertically disposed switch actuating post 162. As illustrated, the upper end of the post 162 preferably extends through an elongate slot in an L-shaped guide plate 166 and has a small roller bearing 164 mounted on the end thereof and running on said guide plate for antifriction alignment purposes.

Horizontal reciprocation of the rack 134 and concomitant lineal displacement of the dependent rods 152 and 154 having the roller bearings 156, 158 mounted on the dependent end thereof is readily effected by selective control of the direction and duration of rotation of the motor 122.

Rotative displacement of said motor shaft is transmitted through the drive gear 124, the idler gear 126 and pinion 128 and is translated into lineal displacement of the rack 134 and rack base 138. Control of the direction and duration of rotation of the drive motor 122 and concomitant limitation of the length of the path of reciprocation of the rack 134 defining the first and second stylii indexing position is effected by selective switch actuation by the vertically disposed switch actuating post 162 in cooperation with the abutting engagement of the support member 138 with the standards 144, 146. As illustrated, the switch actuating post 162 is positioned to engage an extended switch actuating arm 170 during horizontal displacement of the rack 134 in one direction to open normally closed electrical switch 172, and to engage a second extended switch actuating arm 174 during horizontal displacement in the other direction to open a second normally closed electrical switch 176. By properly locating the depending stylii 152, 154 relative to the center line of the mounted visual media and by effectively controlling the limiting or indexing positions thereof relative to said center line, as in the illustrated construction, complemental indexing recesses may be readily and selectively prelocated in the marginal edge of visual media so as to permit utilization of both surfaces thereof by mere reversal of the hereinafter described booklike arrangement thereof. As will be explained immediately hereinbelow, the selective opening of the switches 172 and 176 which takes place when the ends of the support member 138 are closely adjacent to the standards 144, 146 serves to open the circuit for the motor 122 and halt its operation with any overtravel of the rack assembly being limited by the standards 144, 146 thereby positively defining the limits of rack and stylii displacement and the locations of said first and second indexing positions.

Figure 8:
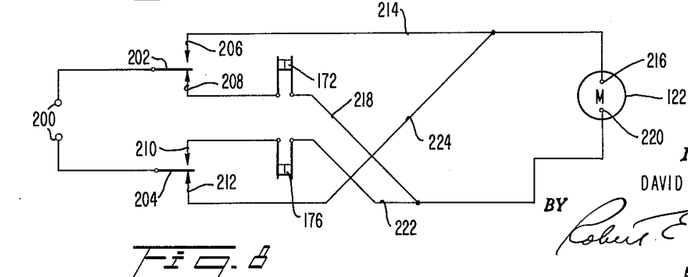
FIGURE 8 is a schematic circuit diagram of the motor control circuit for the drive motor included in the illustrated page release indexing assembly.

FIGURE 8 illustrates, by way of example, a suitable control circuit for controlling the direction and duration of operation of the D.C. motor 122 and to thereby effectively control the direction and limits of reciprocating displacement of the rack 134 and the indexing stylii associated therewith. There is provided a source 200 of relatively low D.C. voltage, conveniently the rectified output of the low voltage filament transformer for the audio amplifier means disposed in the sound reproducing unit. The terminals of the voltage source 200 are directly connected to the movable armatures 202, 204 of a latching relay of conventional construction. Such movable armatures 202, 204, as is conventional in latching relays, are adapted to be displaced in unison upon energization of the latching relay energizing coil and, after such displacement, to remain latched in their displaced condition until the next subsequent energization of the latching relay energizing coil effects a delatching and return thereof to their initial latched position. As illustrated, the armature 202 is displaceable intermediate first and second relay contacts 206 and 208 and the armature 204 is displaceable intermediate third and fourth relay contacts 210 and 212. As mentioned above, the armatures 202, 204 are adapted to be displaced in unison upon energization of the latching relay energizing coil and are so arranged as to be in selective simultaneous contact with the contacts 208, 212 (as illustrated) or in selective simultaneous contact with the contacts 206, 210. The first relay contact 206 is connected by means of a lead 214 to one input terminal 216 of the D.C. motor 122. The second relay contact 208 is connected through the normally closed switch 172 by means of a lead 218 to the second input terminal 220 of said motor 122. The third relay contact 210 is connected through the normally closed switch 176 by means of a lead 222 to the second motor terminal 220. The fourth relay contact 212 is directly connected as by a lead 224 to the first motor terminal 216.

In operation of the above circuit, a suitable D.C. potential is continuously applied across the input terminals 200 and is thus continuously present across the movable armatures 202, 204 of the latching relay. With the armatures positioned as illustrated, the drive circuit for the motor 122 is effected through relay contact 208, normally closed switch 172, lead 218, through the motor 122 and returns through the lead 224, the relay contact 212 and armature 204. The direction of the current flow through the motor 122 will effect selective rotation thereof in one direction and will initiate lineal displacement of the rack 134 from one limiting position towards the other, for example towards switch actuating arm 170. The lineal displacement of the rack 134 will continue until the switch actuating post 162 engages the extended actuating arm 170 and effects an opening of the switch 172. Upon the opening of the switch 172, the heretofore described motor circuit will be opened and motor operation will be halted and the depending stylii 152, 154 will be disposed at their limiting or indexing position in abutting relation with the standard 146. Such stylii positioning will be maintained until the energizing coil for the latching relay is again energized, as effected by the sensing of a synchronizing signal through the control circuit means 22 or by depression of the manual control button 46. Upon such energization of the latching relay, the armatures 202, 204 will be transferred in unison into electrical engagement with relay contacts 206 and 210, respectively, and will be latched in such position. A motor circuit is thus again completed through the armature 202, relay contact 206, lead 214, motor 122, lead 222, normally closed switch 176, relay contact 210 and armature 204. With the armatures 202, 204 so located, the current flow through the motor 122 is in the opposite direction from that heretofore described and the motor will reverse its direction of rotation. The reversal of the direction of the motor operation effects a lineal displacement of the rack 134 and dependent stylii 152, 154 from the heretofore described limiting position and in the direction opposite that heretofore described. The initiation of such movement will result in a disengagement of the post 162 from the arm 170 and in an automatic closure of the previously opened switch 172. Lineal displacement of the stylii 152, 154 will so continue until the switch actuating post 162 engages the switch actuating arm 174 and opens the normally closed switch 176. The opening of the switch 176 will open the motor circuit and halt motor operation. At the point of cessation of motor operation the support member 138 will be positioned closely adjacent the standard 174 and any overtravel will be limited by engagement therewith to positively dispose the stylii in their other limiting position. The stylii 152, 154 will remain in such limiting or indexing position until the latching relay is again energized in response to the receipt of a synchronizing signal 22.

As will be apparent to those skilled in the art, the above described system or motor operation will effect a reciprocating displacement of the dependent stylii 152 and 154 intermediate defined first and second indexing positions which are spaced a predetermined distance apart and in predetermined uniform relation to the center line of the mounted visual media, and that displacement thereof intermediate the first and second indexing positions is effected by each energization of the latching relay energizing coil in response to the receipt of a synchronizing signal 22 or the manual actuation of the control button 46.

Figure 9:
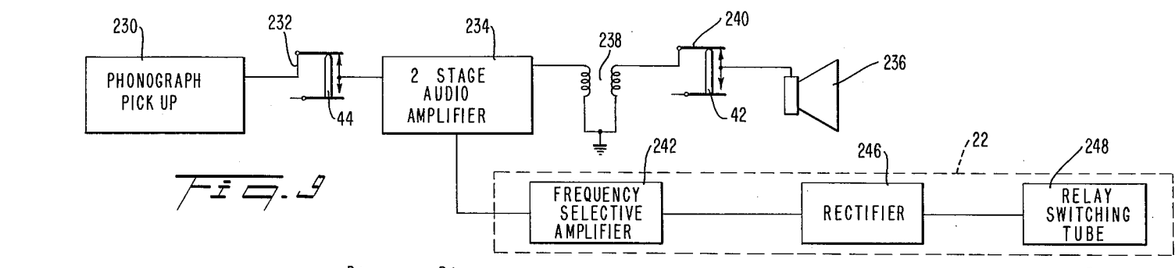
FIGURE 9 is a schematic block diagram of a suitable self-contained and internally disposed audio amplifying means and control circuit means.

FIGURE 9 illustrates, in block diagram form, suitable electrical circuit arrangements for the internally contained audio amplifier means and control circuit means 22. As there illustrated, the output of the phonograph pickup assembly 230 is fed through a normally closed switch 232 into a two-stage audio amplifier 234 of conventional construction. The output of the audio amplifier 234 is conventionally coupled to a loudspeaker 236 through a coupling transformer 238 and a normally closed switch 240. The switch 232 is so arranged as to be opened by insertion of a plug member into the jack 44 (see FIGURE 2) to automatically disconnect the phonograph pickup 230 and connect a tape unit to the audio amplifier 234 in lieu thereof and thereby permit selective utilization of a tape playback unit as a source of the aurally reproducible intelligence in lieu of the illustrated phonograph pickup unit 230.

The switch 240 in the speaker circuit is similarly arranged with respect to the jack 42, so as to effect automatic disconnection of the loudspeaker 236 upon insertion of an earphone plug into said jack 42 to thereby selectively receive the output of the audio amplifier 234 in said earphones and permit utilization of the device by an individual, as for example, as a private tutor without disturbing others in the vicinity thereof.

The control circuit means 22 suitably includes a frequency selective amplifier 242 of essentially conventional construction having its input terminal preferably connected to the output of the first stage of the two-stage audio amplifier 234. As will be explained in more detail hereinafter, the frequency selection amplifier 242 is suitably of the type that includes a parallel T null network in the feedback loop to selectively feed back all frequencies other than the frequency of the synchronizing signal and thereby effect cancellation thereof. The output of the frequency selective amplifier 242, which is essentially a relatively pure amplified 30 cycle pulse is fed into a rectifier 246 and the rectified output thereof is utilized to trigger a normally non-conducting relay switching tube 248 into conducting condition. An energizing control coil for the heretofore described latching relay means is suitably disposed in the plate circuit of the relay switching tube 248 and is arranged to be energized whenever said tube 248 is placed in a conducting position.

Figure 10:
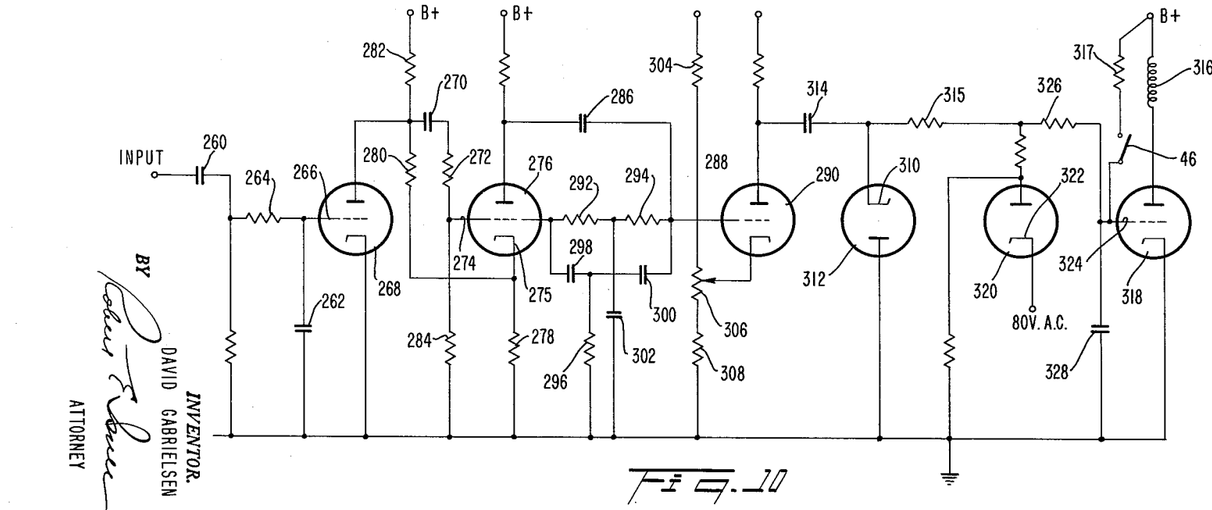
FIGURE 10 is a circuit diagram of a suitable electrical circuit for the control circuit means.

FIGURE 10 is illustrative of a suitable circuit arrangement for the elements includable in a control circuit means 22 to effect the desired actuation of the heretofore described latching relay in response to the sensing of each inaudible 30 cycle synchronizing signal preintroduced into the stored sonic intelligence. As there shown, the input, which is preferably obtained from the output side of the first amplifier stage of the two-stage audio amplifier 234, is applied through a coupling condenser 260 to the control grid 266 of an amplifier tube 268. The capacitor 262 and resistor 264 disposed in the grid circuit thereof form an R-C filter network to effect an initial and partial attenuation of frequencies other than that of the synchronizing pulse, i.e. the 30 cycle pulse. The output of the amplifier 268 is fed through a second R-C filter formed of capacitor 270 and resistor 272 to effect a further partial attenuation of frequencies other than that employed for the synchronizing signal and is applied to the control grid 274 of the frequency selector amplifier tube 276. The cathode 275 of said tube 276 is suitably biased by a voltage divider network that includes resistors 278, 280 and the plate load resistor 282 of the pre-amplifier stage 268 connected intermediate the plate supply voltage and ground. The grid 274 is connected to ground through a suitable grid bias resistor 284. The output of the frequency amplifier tube 276 passes through a coupling condenser 286 and is applied to the grid 288 of a voltage amplifier tube 290. Connected intermediate the grids 274 and 288 of the frequency selective amplifier tube 276 and voltage amplifier tube 290, respectively, is a parallel T null network formed of resistors 292, 294, 296 and capacitors 298, 300 and 302. The illustrated parallel T null network is thus included in the feed-back loop for the tube 275 and the circuit constants thereof are chosen to selectively feed back frequencies other than the 30 cycle synchronizing signal and to thus actively cancel the same on the grid 274. The amplified wave form that thus appears on the grid 288 of the voltage amplifier tube 290 is therefore essentially a pure 30 cycle signal. The cathode of the voltage amplifier tube 290 is suitably biased by means of a connection to a voltage divider network formed of fixed resistors 304 and 308 and adjustable resistor 306.

The amplified 30 cycle signal output of the amplifier tube 290, which is present only when a synchronizing signal is sensed, is applied to the cathode 310 of a rectifier 312 through a coupling condenser 314. The rectified D.C. output of the rectifier tube 312 is a positive pulse of D.C. voltage.

The energizing control coil 316 for the heretofore described latching relay means is disposed in the plate circuit of a relay switching tube 318. The relay switching tube 318 is normally biased beyond cut-off by the presence of a negative rectified D.C. voltage obtained by rectification of 60 cycle voltage in the rectifier tube 320. As illustrated, the rectifier tube 320 has its cathode 322 connected to a source of alternating voltage. The negative rectified output thereof appears on the grid 324 of the relay switching tube 318 and is of such magnitude as to normally bias said tube 318 beyond cut-off. When the positive voltage resulting from the rectified 30 cycle pulse appears across resistor 315 it is in opposition to the negative D.C. output of the rectifier tube 320 and effectively raises the voltage on the grid 324 of the relay switching tube 318 beyond cut-off and initiates conduction thereof. As illustrated, the grid 324 is connected to an R-C circuit formed of resistor 326 and capacitor 328 and a slightly extended period of conduction of tube 318 is effected by the charging of said condenser 328 so as to assure a sufficient duration of control relay coil energization to permit latching relay armature displacement. When the relay switching tube 318 conducts, current flows through the energizing control coil 316 for the latching relay, energizing the same and effecting a displacement of the latched armatures 202 and 204 (FIGURE 8) from one set of contacts to the other.

The manually operable switch 46 is connected in series with a limiting resistor 317 intermediate the plate supply voltage and the grid 324 of the relay switching tube 318, which as indicated above, is normally biased beyond cut-off. Closure of the switch 46 results in raising the voltage on the grid 324 and in conduction of tube 318 with consequent energization of the latching relay.

As will be apparent to those skilled in this art, the action of the above described circuit is such as to sense and effect a selective amplification of the 30 cycle synchronizing signal incorporated in the stored intelligence and to provide a synchronized output signal of sufficient strength and duration to effect energization of the latching relay and consequent displacement of styli 152, 154 from one indexing position to the other, as described above.

Figure 11:
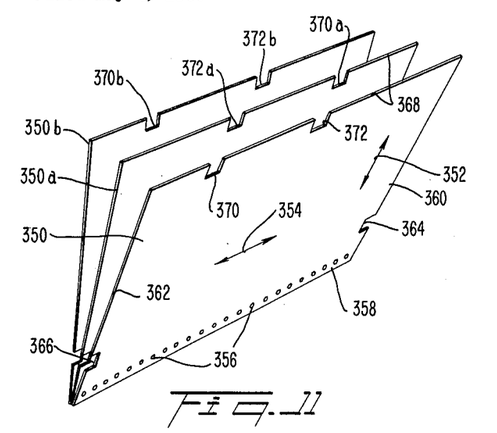
FIGURE 11 is an oblique view of a plurality of page elements of preferred construction and illustrative of the arrangement thereof in book-like form.

FIGURE 11 illustrates the preferred constructional configuration and arrangement for the individual pages 350, 350a, 350b etc. of the booklike arrangement upon which the visual media is directly presented or supported. As illustrated, each page 350 is rectangular in shape with the longer dimension running in the direction of the arrows 354 and is formed of relatively heavy index type paper stock or of relatively heavy card stock. Such material should be formed to have a strong grain running in vertical direction, i.e. as indicated by the arrows 352, to give the individual pages a considerable amount of inherent resilience with the amount thereof desired varying in accordance with the size of the page. The paper stock surface is preferably coated with plastic or varnish so as to provide a smooth hard surface to prevent or at least minimize moisture absorption and to maintain its inherent resilience under varying climatic conditions. A suitable paper stock is the Regal Paper Company's "Tuff-Wite" in 150 lb. or heavier weight and formed, as described above, with a strong grain running in the direction indicated by the arrows 352.

The individual pages 350 are formed with a plurality of uniformly spaced binder receiving perforations 356 along the marginal binding edge 358 thereof. The side edges 360, 362 are provided with small rectangular recesses 364, 366 spaced inwardly a predetermined uniform distance from said marginal binding edge 358. The upper edges 368 are provided with a pair of selectively spaced and sized rectangularly shaped indexing recesses 370, 372. The indexing recesses 370, 372 are spaced apart a distance equal to the spacing of the indexing stylii 152, 154 and are located relative to the vertical center line of the page so as to be in automatic alignment with either the first and second indexing positions of said stylii dependent upon which planar surface thereof is in the forward facing position. This permits all the pages to be die cut in one operation and proper arrangement thereof effected for indexing purposes by alternate page reversal thereof. As illustrated, the individual pages are arranged so that the indexing recesses 370, 372 on the first page 350 are disposed in alignment with one of the limiting positions of the stylii 152, 154, for example, the first indexing position thereof. The recesses 370a and 372a on the second page 350a are disposed in alignment with the other limiting position of the stylii for example, the second indexing position thereof, by mere page reversal as described above. The recesses 370b and 372b on the third page 350b are disposed in alignment with the recesses on the first page 350 and so forth. As will be now apparent, the above construction permits all pages to be prepared by a single die cutting operation and yet permits utilization of both sides of each page for the presentation of visual media in proper sequence by mere reversal of the mounting of the assemblage thereof.

Figure 12:
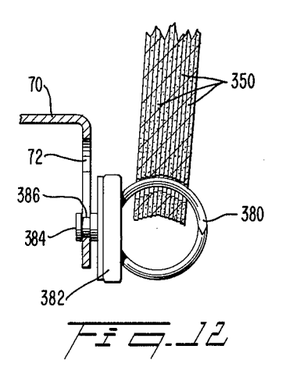
FIGURE 12 is a fragmentary sectional view illustrating the binding and mounting of the page elements.
Figures 13, 14, 15, 16:
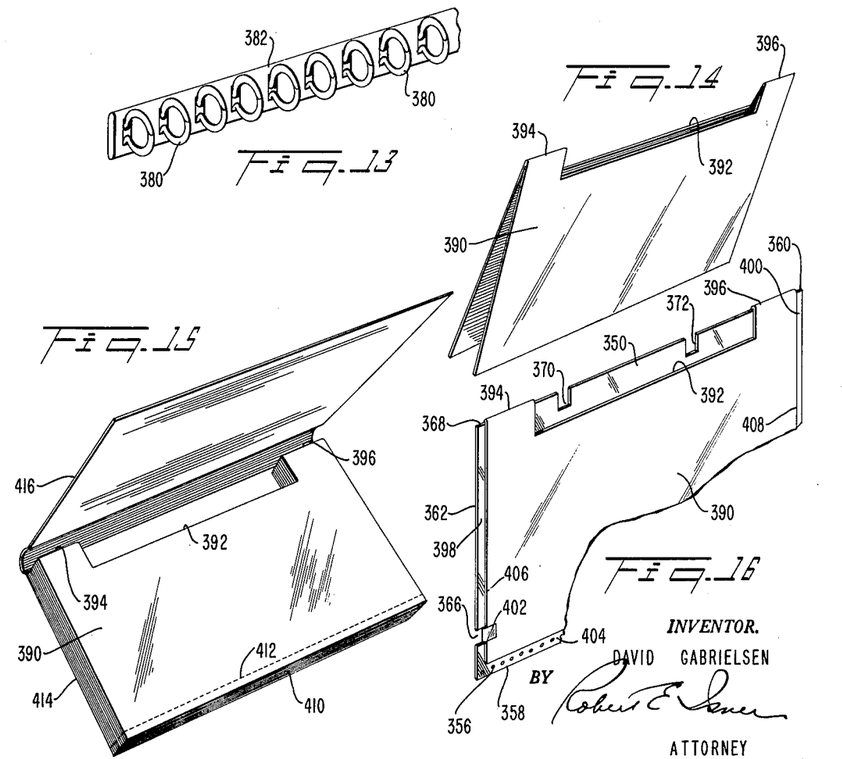
FIGURE 13 is an oblique view of the backing or binding strip for the page elements.
FIGURE 14 is an oblique view of the preferred construction and configuration for a folded overlay page adapted to have the visually presentable media imposed thereon.
FIGURE 15 is an oblique view of a plurality of blank overlay elements in conveniently assembled pad form.
FIGURE 16 is an oblique view illustrating the mounting and positioning of overlay elements on the page elements of FIGURE 11.

An assemblage of pages as illustrated in FIGURE 11 and arranged as described above are mounted on a rigid backing or mounting member in the general form of a ringbinder, as illustrated in FIGURES 12 and 13, to form a booklike arrangement thereof for the sequential presentation of visual media. As there illustrated, the mounting member includes a plurality of substantially circular mounting rings 380 sized to freely pass through the perforations 356 disposed along the marginal edge 358 of the pages 350 and to thereby form an essentially continuous rigid support for the marginal binding edge thereof which prevents any undesired twisting or bending thereof that could adversely affect the page release indexing operation. The rings 380 are mounted on a rigid backing strip 382 and preferably are of such nature as to be openable, as per, for example, the conventional loose leaf binder assemblies, to permit page collation and selective page arrangement by the ultimate user thereof. The rear of the backing strip 382 contains selectively located integral mounting means complementally engageable with the selectively located mounting means on the mounting strip 70 secured to the lower edge of the heretofore described cover member 64 to firmly secure the marginal edge of said booklike assemblage to the cover member and to automatically properly position the indexing recesses 370, 372 etc. of the sequentially arranged pages thereof relative to the first and second indexing positions of the stylii 152, 154. In the particular illustrated example, the mounting means on the mounting strip 70 (FIGURE 2) consists of the selectively shaped keyhole-like apertures 72, 74. The complemental mounting means on the back of the backing strip 382 are in the form of a pair of studs or pins 384 having an annular recess 386 therein sized to be received within the reduced size portion of the keyhole-like apertures 72, 74 and thereby permit easy inserting and removal of the booklike arrangement of visually presentable media and a firm and secure mounting thereof in proper positional relationship with the indexing stylii for operational purposes. If desired the pins 384 could be mounted on the strip 70 and the keyhole apertures included in the body strip 382.

A complete sequence of operations will now be described. A unit such as illustrated in FIGURES 2 and 3 is placed upon a suitable horizontal surface and plugged into a convenient source of electrical power. The cover member 64 is pivotally displaced into its open position as illustrated in FIGURE 2 and locked in such position by displacement of the dependent end of the spine member 76 into the receptacle 80 and locking said spine 76 as so positioned by rotative displacement of the knob assembly 84. The knob 100 is then extended and positioned by the disposition of the dependent end of the set screw 98 in the intermediate transverse track 96 in the keyway 89.

A pre-prepared booklike arrangement of pages 350 is there mounted by introducing the pins or studs 384 on the back of the backing strip 382 into the keyhole-like apertures 72, 74 in the muonting strip 70 in such manner as to locate the annular recesses 386 in the reduced size portions of the keyhole apertures 72, 74. The book of visual media is then pivotally displaced about its now secured binding edge and the upper marginal edge 368 is placed behind the dependent stylii 152, 154, which should be located at the indexing position disposed remote from the indexing recesses 370, 372 on the first or exposed media page 350. Stylii positioning for loading operation can be readliy effected by manual operation of the button 46. As best shown in FIGURE 3, a properly positioned book of visually presentable media is securely positioned along its marginal binding edge, has its upper marginal edge disposed behind the dependent indexing stylii and is releasably retained at at least two separated locations thereby, and is deformed so as to be forwardly bowed or biased for falling pivotal displacement by the extended knob member 100 disposed in compressive engagement against the rear of the mounted book substantially centrally thereof.

With the book of visually presentable media so positioned, a record 14 containing the aurally reproducible sonal intelligence and the pre-introduced synchronizing signals is placed on the turntable 34, turntable rotation started, and the pick-up arm 36 located at the start thereof. From here on operations are entirely automatic. As the aural intelligence is sonically reproduced, the lead or exposed page 350 of the visually presented media will remain in view of the observers thereof. Upon receipt of the first inaudible synchronizing signal, the indexing stylii 152, 154 will be lineally displaced towards the indexing recesses 370, 372 on the exposed media page. When these stylii reach their indexing position, for example, the first indexing position, they will be disposed within the recesses 370, 372 of said first page, out of retaining engagement therewith and in retaining engagement with the marginal edge portion 368 of the next succeeding page. Upon the release of stylii engagement with the lead page, the inherent resilience thereof tends to cause it to reassume a planar condition. However, since such page is secured along its mounting or binding edge and is subjected to a pressure by the knob 100 adjacent its center, the inherent resilience thereof is translated into an initial rapid pivotal displacement thereof about its marginal bound edge towards the horizontal position on the support plate 54 and rapid removal thereof from the view of an observer and concomitant rapid exposure of the visually presented media on the succeeding and now exposed page being retained by the stylii 152, 154. Such operation is repeated upon the recept of each synchronizing signal contained in the stored sonal intelligence until all the pages in the book of media have been displaced into the horizontal position. Upon completion the production may be rerun or the book may be removed, reversed and replaced and the record reversed to utilize the heretofore unused obverse sides of both the visual and audio intelligence storage units.

The above described system provides for the disposition of greatly increased amounts of transmittable intelligence in a single visual-aural record and book combination as well as a permitted use of large size visually presentable media. In the illustrative embodiment there is effectively no width limitation in the size of the media page. This, coupled with the above described visual media mounting and positioning means, has readily permitted use of visual media 14 by 18 inches in size.

Although the above described paper stock for the pages 350 can readily have the visually presentable media printed or otherwise directly applied or imposed thereon, economic and other considerations will often dictate the utilization of such pages 350 as a reusable support for the visually presentable media. To this end the herein disclosed invention includes the utilization of specially contoured overlays that are readily mountable on and removable from the individual pages 350. Such overlays can be made of much lighter paper stock, can be printed by continuous printing or other varied reproduction methods in large quantities and can also be formed of special papers, such as the diazotype, that are suitable for low cost reproduction of line and half tone illustrations. Apart from the material economic savings inherent in the utilization of such overlays to the ultimate users thereof, such overlays also provide an extreme flexibility of use to the ultimate user by enabling him to selectively and economically prepare his own visual media in quantities as low as a single copy thereof. To this end there is provided, as illustrated in FIGURES 14 and 16, a specially contoured overlay 390. The overlay 390 is in the form of a folded sheet having the halves thereof of equal size and provided with an elongate cutout portion in the form of a rectangular recess 392 in the folded edge thereof and defining terminally disposed folded portions 394, 396. As best shown in FIGURE 16, the overlay 390 is slipped over the page 350 and supported thereon by the abutting overlying relation of the folded terminal ends 394, 396 of the overlay on the upper edge 368 of the page 350. As illustrated, the overlay 390 is sized to be slightly smaller than the page 350 so as to leave exposed marginal side edge portions 398, 400 adjacent the side edges 362 and 360 of the page 350 and an exposed marginal edge 404 inwardly of the line of perforations 356. Although such overlay may be removably secured by known adhesives, to readily facilitate preferred securement and removal of the overlay 390 without damage to the page 350, the overlay is sized so that the side edges 406, 408 thereof are disposed in alignment with, or slightly extend beyond the bases of the rectangular recesses 366, 364 in the page 350. This permits to two pages of the folded overlay to be easily and readily secured together by small U-shaped pieces of clear pressure sensitive cellophane tape 402 disposed within said recesses 364, 366 and thereby out of adhesive contact with the page 350. Such securement, coupled with supporting engagement of the terminal folds 394, 396 on the upper edge 368 of the page 350 prevents displacement of the overlay 390 in any direction and yet is readily removable by a user, as by cutting the adhesive strip, without any damage to either the overlay 390 or to the support page 350. As will be apparent, the elongate recess 392 is sized to expose the indexing recesses 370, 372 on the upper edge 368 of the page 350 and permit unimpeded displacement of the indexing stylii 152, 154.

As shown in FIGURE 15, such folded overlay pages 390 may be conveniently preassembled in pad form having a conventional glue binding 410 and suitably perforated, as at 412, adjacent thereto for ready separation thereof. If desired, such pad can be provided with a relatively rigid backing page 414 and a foldable cover 416 to protect any visual media as, for example, sketched thereon by a user. This arrangement of the overlay pages 390 thus renders the same conveniently available in inexpensive form to a user thereof and greatly facilitates individual preparation of the visually presentable media in single copies thereof.

Figures 17, 18, 19:
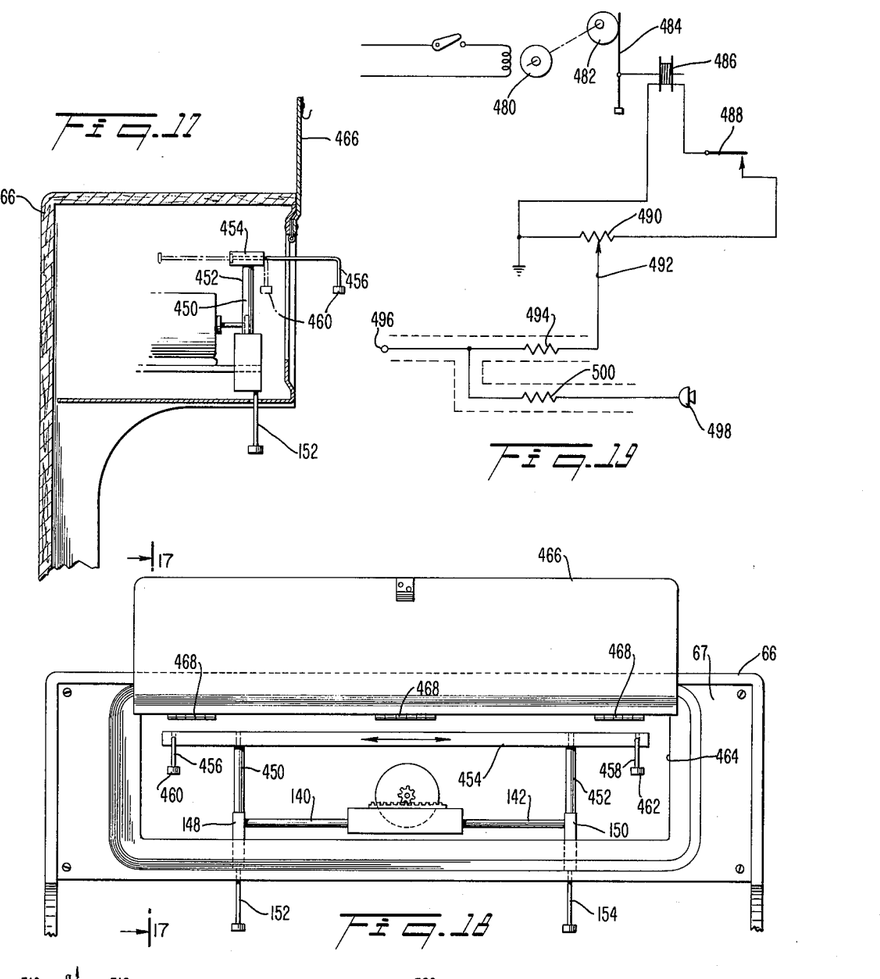
FIGURE 17 is a fragmentary sectional view as taken on the line 17—17 of FIGURE 18.
FIGURE 18 is a front elevational view of an alternative operational construction for a page release indexing assembly adapted to accommodate a plurality of sizes of visually presentable media.
FIGURE 19 is a schematic diagram of a synchronizing signal generator for effecting the introduction of synchronizing signals at predetermined desired intervals into stored aural intelligence.

FIGURES 17 and 18 are illustrative of an alternate and preferred construction for a page release indexing means adapted to be disposed in the terminal end portion 66 of a cover member 64. The specifically illustrated unit is of the type illustrated in FIGURE 2 but incorporating an additional set of stylii so as to enable such unit to conveniently handle books of visually presentable media of further enlarged size. Common elements will bear the same reference numerals as heretofore employed.

As shown there are provided a pair of upright support members 450, 452 mounted on the upper surface of the connector members 148, 150 at the ends of the rods 140, 142, respectively. Secured to the top of the support members 450, 452 is a horizontally disposed plate member 454. Slideably mounted at each end of the plate member 454 and displaceably transversely thereof are an auxiliary pair of indexing stylii 456, 458. As best shown in FIGURE 17, the stylii are of a generally L-shaped configuration having roller bearings 460, 462 mounted on the dependent ends thereof and are slideably displaceable from an extended position, illustrated by the solid lines, to a retracted position as illustrated by the dotted lines. When in extended condition, as illustrated in FIGURE 17, the stylii 456, 458 extend through a recessed rectangular aperture 464 in the cover plate 67. When the stylii 456, 458 are disposed in their retracted position, said aperture 464 is covered by a displaceable cover member 466 hingedly connected as at 468 which effectively hides said stylii from the view of an observer.

By the above construction, it will be apparent that the lower or dependent stylii 152, 154, as described earlier in conjunction with FIGURES 2, 6 and 7, are always available for use with a booklike arrangement formed of pages of a given size as for example, 14" x 18". If pages of a larger size, for example, 18" x 24" are to be used, the cover plate 466 is open and biased in open position. The recessed stylii 456, 458 are then manually extended to the advanced position as illustrated in FIGURE 17 and as such are readily available for use with pages 350 of appropriate increased size. Preferably the auxiliary indexing stylii 456, 458 are spaced further apart than the stylii 152 and 154, since improved positioning of the larger size pages is obtained by a further separation of the indexing stylii. Since the stylii 456, 458 are mounted on the connecting members 148, 150, they will move in unison therewith and will traverse, during their reciprocation a predetermined path having predetermined limited or indexing positions as was described above in detail in conjunction with the FIGURES 6 and 7 assembly. As is apparent the indexing recesses in the larger sizes of paper 350 will be suitably located to permit indexing and page releasing operations in the same manner as that described in the earlier portions of this specification. The proper biasing of the mounted book for displacement to the horizontal plane is again effected by extension of the knob 100. When utilized in conjunction with the stylii 456, 458 said knob is moved to its extended position as determined by the disposition of the dependent end of the set screw 98 in the terminal transverse track 92.

FIGURE 19 schematically illustrates a suitable construction for a signal generator to generate a 30 cycle synchronizing signal and for effecting the introduction thereof into stored sonic intelligence. As there shown, a continuously operable motor 480 running at a speed, for a 30 cycle signal, of 1800 r.p.m., drives a slightly eccentric rotor 482. The eccentric rotor 482 bears against a lever arm 484 which applies pressure to a piezo electric crystal generator 486. The piezo electric generator 486 is connected in series with a button operated switch member 488, and a variable gain control resistor 490. The movable contact 492 of the resistor 490 is connected, through a resistor 494, to a terminal 496. A sonic input unit, for example a microphone 498, is also connected, through a resistor 500, to said terminal 496. The illustrated unit is, by way of example, particularly adapted for utilization with a single input tape recorder. The terminal 496 is adapted to be connected to the input of the tape recorder and the desired aural intelligence is introduced therein through the microphone 498. Whenever it is desired to introduce a 30 cycle synchronizing signal into the stored intelligence, all that is required is to close the switch 488, since the piezo electric generator is being periodically compressed by the action of the motor driven eccentric rotor 482 and lever 484. The resulting signal, upon closure of the switch 488, is a 30 cycle signal of essentially pure sinewave configuration, which appears as the desired inaudible synchronizing signal in the resultant stored sonal intelligence.

Figure 20:
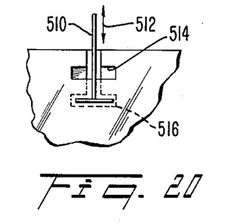
FIGURES 20 and 21 are fragmentary schematic views of alternate page release indexing operations.
Figure 21:
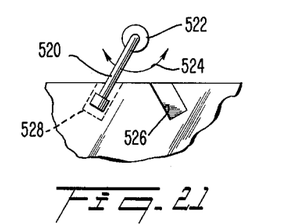

FIGURES 20 and 21 illustrate possible additional complemental configurations for a page release indexing mechanism. As illustrated in FIGURE 20, a vertically displaceable T-shaped stylus 510 is provided and adapted for use with vertically staggered T-shaped indexing recesses 514, 516 on sequentially arranged pages of visually presentable media. In operation of such a system, the T-shaped stylii will be vertically reciprocated as indicated by the arrows 512 to effect the desired page retention and page release indexing.

In the FIGURE 21 embodiment, an indexing stylus 520 is pivotally mounted as at 522 and adapted to be oscillated through a predetermined arc, as indicated by the arrows 524. Complementally associated therewith are angularly disposed indexing recesses 526 and 528 alternately arranged on the upper marginal edges of the successive pages of visually presentable media. In this embodiment, rotative displacement of the stylii 520 through a predetermined arc intermediate first and second indexing positions will result in the desired sequential release of the pages.

As will be apparent to those skilled in this art, the above described structures incorporating the principles of this invention have an extremely wide versatility of use and can be fabricated with a self-contained aural sound reproduction unit or as a subassembly for effecting the selective presentation of visual media in conjunction with a user's own sound reproducing units such as a phonograph or tape recorder or tape playback unit.

Having thus described my invention, I claim:

1. A device for effecting the selective presentation of visual media in synchronized relation with sonic intelligence comprising means for supporting the dependent marginal binding edges of a plurality of separate and independently arcuately displaceable visual media bearing pages in contiguous relation and for guiding the path of each of said dependent margin edges during independent arcuate displacement thereof, reciprocable indexing means disposed above said supporting and guiding means and engageable with the lead and exposed page of said plurality of pages adjacent the upper marginal edge portion thereof for releasably retaining said plurality of pages in a substantially vertical plane, means positioned intermediate said supporting means and indexing means and disposed remote from said indexing means and in compressive engagement with the last page of said plurality of pages for pressure biasing said plurality of pages for displacement to a horizontal plane, means responsive to a predetermined signal for displacing said indexing means into page releasing relation with said lead and visually exposed page and into page retaining engagement with said succeeding page to effect the selective release of said lead and visually exposed page of said plurality of pages and permit pressure induced independent arcuate displacement thereof to a horizontal plane, and means for aurally reproducing related stored sonal intelligence having said predetermined signals inaudibly incorporated therein.

2. A device for effecting the selective presentation of visual media in synchronized relation with sonic intelligence comprising a base member, a cover member pivotally connected to said base member and displaceable into upright location substantially perpendicular thereto, means disposed adjacent the pivotal connection of said base and cover members for supporting the dependent marginal binding edge of a plurality of separate and independently arcuately displaceable visual media bearing pages and for guiding the path of each of said dependent marginal edges during independent arcuate displacement thereof, reciprocable indexing means disposed above said supporting means and positioned to traverse the upper marginal edge portion of the lead and exposed page of said plurality of pages for releasably retaining said plurality of pages in a substantially vertical plane, means positioned intermediate said securing and indexing means and remote from said indexing means and in compressive engagement with the rear page of said plurality of pages for biasing said plurality of pages for displacement toward said base member, means responsive to a predetermined signal for displacing said indexing means from one limiting position to a second limiting position wherein said means are in page releasing relation with said lead and visually exposed page and in page retaining relation with the succeeding page to effect selective release of said lead page and permit displacement thereof toward said base member, and means for aurally reproducing related stored sonal intelligence having said signals inaudibly incorporated therein.

3. A book like arrangement for the selective and sequential presentation of visual media comprising a rigid backing strip having mounting means selectively located on one side thereof and a multiplicity of generally circular page supporting ring members mounted on the other side thereof, a plurality of separate and discrete aligned, uniform sized, rectangularly shaped page elements individually mounted on said ring members adjacent a marginal edge thereof and each having first and second side edges and an upper marginal edge, said first and second side edges of said pages being shaped to provide recesses disposed adjacent the marginal binding edge thereof for overlay securement thereto, said upper marginal edges of the oddly numerable pages of said plurality thereof being shaped to provide a first indexing recess disposed inwardly a first predetermined distance from said first side edges thereof and a second indexing recess disposed inwardly a second predetermined distance from said second side edges thereof, and said upper marginal edges of said evenly numerable pages of said plurality thereof being shaped to provide a first indexing recess disposed inwardly of said first side edges a distance equal to said second predetermined distance and a second indexing recess disposed inwardly of said second side edges a distance equal to said first predetermined distance whereby selective indexing and sequential page release may be effected by reciprocation of indexing means traversing the plane of said pages and sized to be introducible into said recesses.

4. In a multisensory intelligence transmission device, means for aurally reproducing stored sonal intelligence, means for releasably positioning a plurality of separate selectively indexed and independently arcuately displaceable visual media bearing pages in a substantially vertical plane including means for supporting the dependent marginal edge portions of said pages in contiguous relationship and for guiding the paths of independent arcuate displacement thereof, displaceable indexing means disposed above said dependent marginal edge portion supporting means for releasably retaining said plurality of pages in contiguous relation in a substantially vertical plane and means selectively contacting said pages intermediate said indexing means and dependent marginal edge supporting means and remote from said indexing means for pressure biasing each of said pages for independent arcuate displacement from said substantially vertical plane to a substantially horizontal plane and means responsive to synchronizing signals contained in said stored sonal intelligence for effecting displacement of said indexing means and selective release of the visually exposed lead page in said plurality of pages to permit initiation of pressure induced arcuate displacement thereof to a substantially horizontal plane.

References Cited by the Examiner

UNITED STATES PATENTS

| | | | |
|---|---|---|---|
| 454,559 | 6/1891 | Medowcraft | 40—103 |
| 584,450 | 6/1897 | Anthony | 40—103 |
| 614,372 | 11/1898 | Ramus | 40—103 |
| 859,725 | 7/1907 | Beaver | 40—103 X |
| 1,073,347 | 9/1913 | Von Heissig | 40—103 |
| 1,170,325 | 2/1916 | Poposkey | 40—28.2 |
| 1,320,683 | 11/1919 | Goodhue | 129—20 |
| 2,031,605 | 2/1936 | Jenkins | 40—28.3 X |
| 2,080,901 | 5/1937 | Takahaski et al. | 40—28.1 |
| 2,170,147 | 8/1939 | Lane | 206—56 |
| 2,323,638 | 7/1943 | Wise | 40—28.1 |
| 2,630,122 | 3/1953 | Amberg | 129—20 |
| 2,831,277 | 4/1958 | Strachan | 206—53 |
| 2,993,408 | 7/1961 | Cook | 40—28.1 X |
| 3,028,789 | 4/1962 | Wade | 40—28.3 X |

FOREIGN PATENTS 672,395   5/1952   Great Britain.

JEROME SCHNALL, *Primary Examiner.*

EDWARD V. BENHAM, *Examiner.*